United States Patent
Razzaboni et al.

(10) Patent No.: US 12,168,535 B2
(45) Date of Patent: Dec. 17, 2024

(54) APPARATUS FOR FILLING AND SEALING BAGS INTENDED FOR CONTAINING BANKNOTES

(71) Applicant: CIMA S.P.A., Mirandola (IT)

(72) Inventors: Vittorio Razzaboni, Mirandola (IT); Nicoletta Razzaboni, Mirandola (IT)

(73) Assignee: CIMA S.P.A., Mirandola (IT)

( * ) Notice: Subject to any disclaimer, the term of this patent is extended or adjusted under 35 U.S.C. 154(b) by 58 days.

(21) Appl. No.: 18/248,784

(22) PCT Filed: Oct. 13, 2021

(86) PCT No.: PCT/IB2021/059392
§ 371 (c)(1),
(2) Date: Apr. 12, 2023

(87) PCT Pub. No.: WO2022/079625
PCT Pub. Date: Apr. 21, 2022

(65) Prior Publication Data
US 2023/0365284 A1    Nov. 16, 2023

(30) Foreign Application Priority Data

Oct. 15, 2020  (IT) .................. 102020000024370

(51) Int. Cl.
*B65B 25/14*   (2006.01)
*B65B 51/14*   (2006.01)

(52) U.S. Cl.
CPC ............ *B65B 25/14* (2013.01); *B65B 51/146* (2013.01)

(58) Field of Classification Search
CPC .................. B65B 25/14; B65B 51/146; B65H 2701/1912
See application file for complete search history.

(56) References Cited

U.S. PATENT DOCUMENTS

2005/0129497 A1* 6/2005 Bogatyrev ........... B65H 3/0816
                                                                414/788
2005/0252171 A1* 11/2005 Brautigam ............ B65B 7/2878
                                                                53/329.3

(Continued)

FOREIGN PATENT DOCUMENTS

CH        547743 A  *  4/1974  ............. B65H 1/025
EP       3473555 A1  *  4/2019  ............. B65B 25/14

(Continued)

OTHER PUBLICATIONS

International Search Report and Written Opinion for International Application No. PCT/IB2021/059392, dated Nov. 10, 2021, 11 pages.

*Primary Examiner* — Lucas E. A. Palmer
(74) *Attorney, Agent, or Firm* — CANTOR COLBURN LLP

(57) ABSTRACT

An apparatus for filling and sealing bags intended for containing banknotes includes a generally parallelepiped-shaped container, with side walls, a bottom and an upper lid provided with an opening for allowing entry into the container of a bag, made up of flexible plastic film, and of banknotes intended to be introduced into the same bag. The apparatus includes a pair of sealing bars arranged at the upper end of the container and a system for controlling and moving the bars between their respective opening and closing positions. The control and movement system of the sealing bars has a motor for driving a shaft adapted to rotate at least one driving pulley arranged below in correspondence with a vertical edge of the container, a kinematic connection for closing the bars comprised of a combination of cables and tension springs connecting the driving pulley to the sealing bars and a kinematic connection for opening the bars comprised of a combination of cables and tension springs (Continued)

connecting the sealing bars to a respective fixed anchor point of the container.

14 Claims, 13 Drawing Sheets

(56) References Cited

U.S. PATENT DOCUMENTS

| | | | | |
|---|---|---|---|---|
| 2011/0052363 A1* | 3/2011 | Brexel | .................. | G07D 11/13 |
| | | | | 414/798.2 |
| 2016/0031574 A1* | 2/2016 | Razzaboni | ............ | B65B 51/146 |
| | | | | 53/268 |
| 2018/0029730 A1* | 2/2018 | Yokoo | .................... | B65H 31/34 |
| 2018/0346198 A1* | 12/2018 | Tan | ........................ | B65H 29/40 |
| 2019/0218052 A1* | 7/2019 | Takemura | ............. | B65H 29/46 |
| 2019/0233147 A1* | 8/2019 | Okuda | .................. | B65B 51/146 |
| 2019/0330005 A1* | 10/2019 | Yokoo | .................... | B65B 25/14 |

FOREIGN PATENT DOCUMENTS

| | | | | |
|---|---|---|---|---|
| GB | 2551204 A | * | 12/2017 | ............. B65H 29/46 |
| JP | 2000247454 A | | 9/2000 | |
| WO | 2014181286 A1 | | 11/2014 | |
| WO | 2014181288 A1 | | 11/2014 | |
| WO | 2014181290 A1 | | 11/2014 | |

* cited by examiner

APPARATUS FOR FILLING AND SEALING BAGS INTENDED FOR CONTAINING BANKNOTES

CROSS-REFERENCE TO RELATED APPLICATIONS

This application is a 35 U.S.C. § 371 National Stage patent application of PCT/IB2021/059392, filed on 13 Oct. 2021, which claims the benefit of Italian patent application 102020000024370, filed on 15 Oct. 2020, the disclosures of which are incorporated herein by reference in their entirety.

TECHNICAL FIELD

The present disclosure relates to an apparatus for introducing banknotes or other paper values into disposable bags, which are adapted to be sealed after having been filled.

This apparatus is intended for use in machines for receiving and storing banknotes, such as those usually found in banks, supermarkets, shopping centres or the like.

BACKGROUND

In the prior art, banknotes are usually introduced into these machines through an inlet port, checked for authenticity and integrity, and then inserted into boxes or into plastic bags that are removably housed within the machine itself.

If plastic bags are used, they can advantageously be of the disposable type, i.e., bags which, after having been filled, are sealed by appropriate sealing blades at the edges of their mouth so that, once opened, they cannot be used again.

Such apparatuses are disclosed for example in applications WO 2014/181288, WO 2014/181286 and WO 2014/181290 by the same Applicant.

In application WO 2014/181288, for example, it is provided that banknotes are first temporarily housed in an upper container and then taken out from it below by means of a pressure element, through an opening at the bottom of said container, to come into contact with a plastic film intended to form the containment bag and to be introduced (through a corresponding opening) into a lower container, where they form an ordered stack within the bag. Once the bag has reached the required filling level, it is sealed at the top by means of specific sealing bars arranged near the aforementioned inlet opening in the lower container.

One of the main problems with these types of machines is related to the size of the sealing blades and of their driving mechanism which, obviously, must also ensure maximum operational reliability.

SUMMARY

The present disclosure overcomes the above-mentioned drawbacks by providing an apparatus for filling and sealing bags for containing banknotes, wherein the sealing blades, arranged in the upper part of the container where the bag is filled, occupy as little space as possible, as well as their kinematic driving mechanism, and also guarantee a high level of operational reliability both as regards the quality of the sealing of the bag and in avoiding banknotes from accidentally spill out in the steps immediately prior to sealing.

In view of such an advantage, it has been conceived an apparatus according to the disclosure for filling and sealing bags for containing banknotes, comprising a generally parallelepiped-shaped container, with side walls, a bottom and an upper lid provided with an opening suitable for allowing entry into the container of a bag, made up of flexible plastic film, and of banknotes intended to be introduced into the same bag, the apparatus further comprising a plate, arranged inside the container for supporting the banknotes inserted into the bag and movable vertically by controlled lowering and raising means, a first and a second sealing bars arranged at the upper end of the container, under the opening of the lid, and moving towards/away from each other between an opening position, in which the bars are far away from each other to allow the introduction of the banknotes into the container through the opening, and a closing position, in which the bars are brought into mutual contact to carry out the sealing of an upper portion of the bag interposed therebetween, and a pressure element vertically movable on command between a raised position, external to the container, and a lowered position for at least the partial insertion into the container through the upper opening to accompany new banknotes to be introduced into the container and to push down banknotes already present in the bag, resting on the plate, the apparatus also including a system for controlling and moving the sealing bars between the respective opening and closing positions, characterized in that the control and movement system of the sealing bars comprises a motor for driving a shaft adapted to rotate at least one driving pulley arranged below at a vertical edge of the parallelepiped-shaped container, a kinematic connection for closing the bars comprised of a combination of cables and tension springs connecting the driving pulley to the sealing bars and a kinematic connection for opening the bars comprised of a combination of cables and tension springs connecting the sealing bars to a respective fixed anchor point on the container.

BRIEF DESCRIPTION OF THE DRAWINGS

To better clarify the innovative principles of the present disclosure and the advantages thereof if compared to the prior art, one possible exemplary embodiment applying such principles will be described below, with the aid of the accompanying drawings. In the drawings.

DETAILED DESCRIPTION OF THE DRAWINGS

Figure 1:
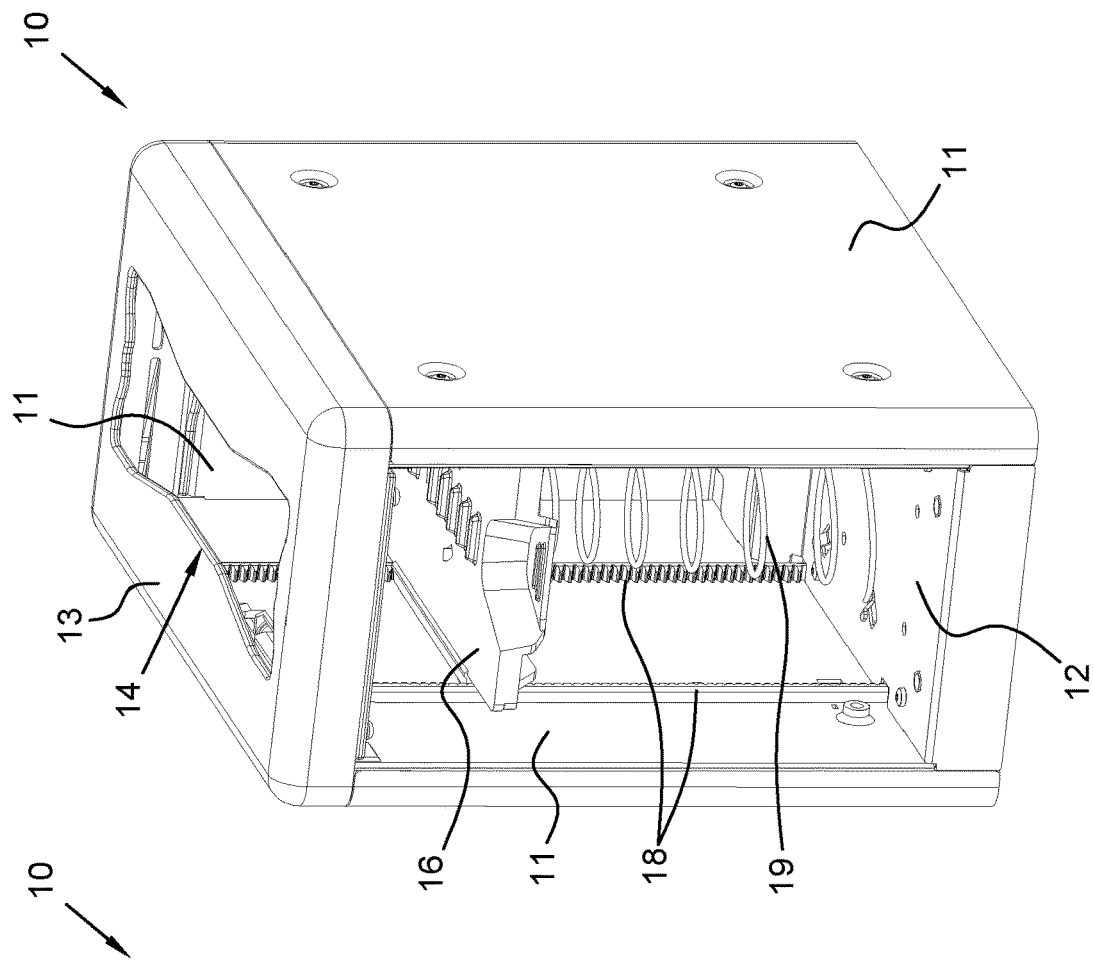
FIG. 1 represents a perspective view of an apparatus according to the disclosure, with the banknote support plate in a fully raised position, i.e., adapted to receive the first banknote to be introduced into the bag.
Figure 2:
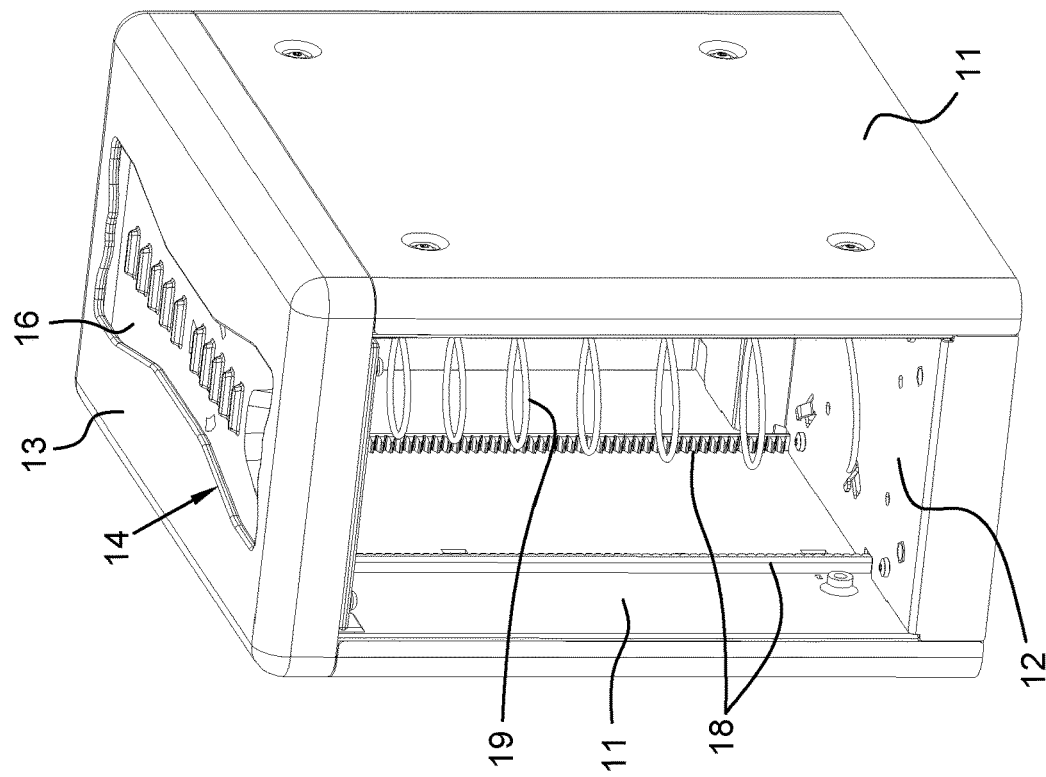
FIG. 2 represents a view similar to FIG. 1, but with the banknote support plate in a lower position, which it assumes when a certain number of banknotes are contained in the bag.
Figure 4:
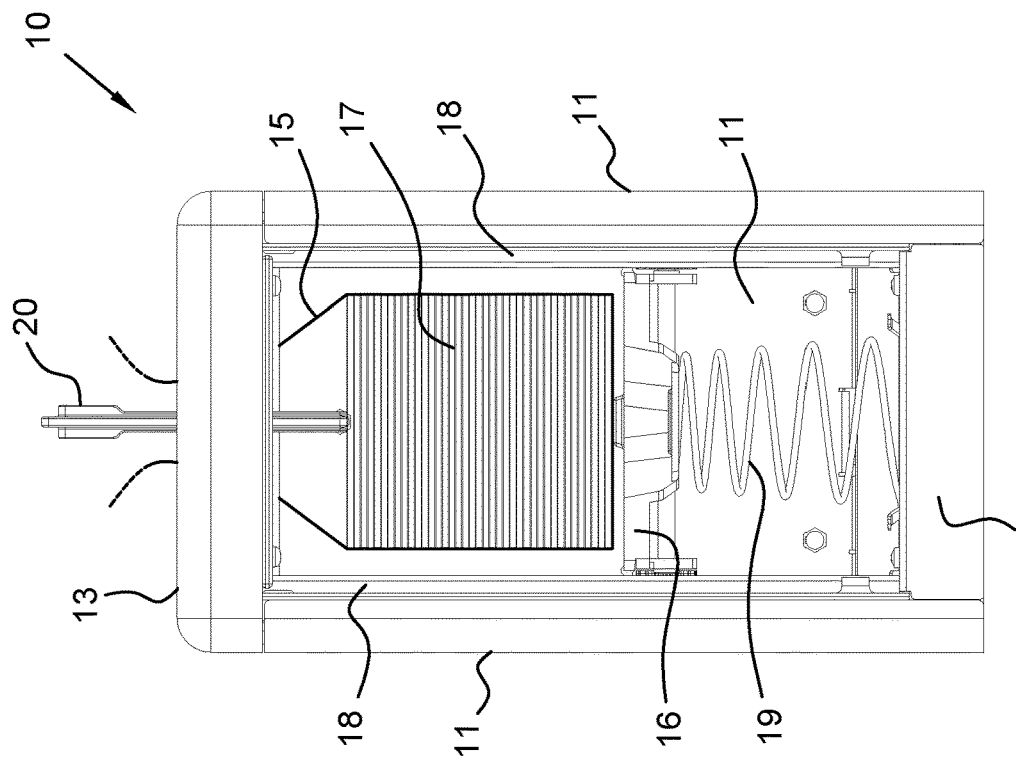
FIG. 4 shows a front elevational view of the apparatus according to FIG. 2, with a stack of banknotes in the bag resting on the plate and the pressure element inserted into the apparatus in a position adapted to press down the stack of banknotes.
Figure 3:
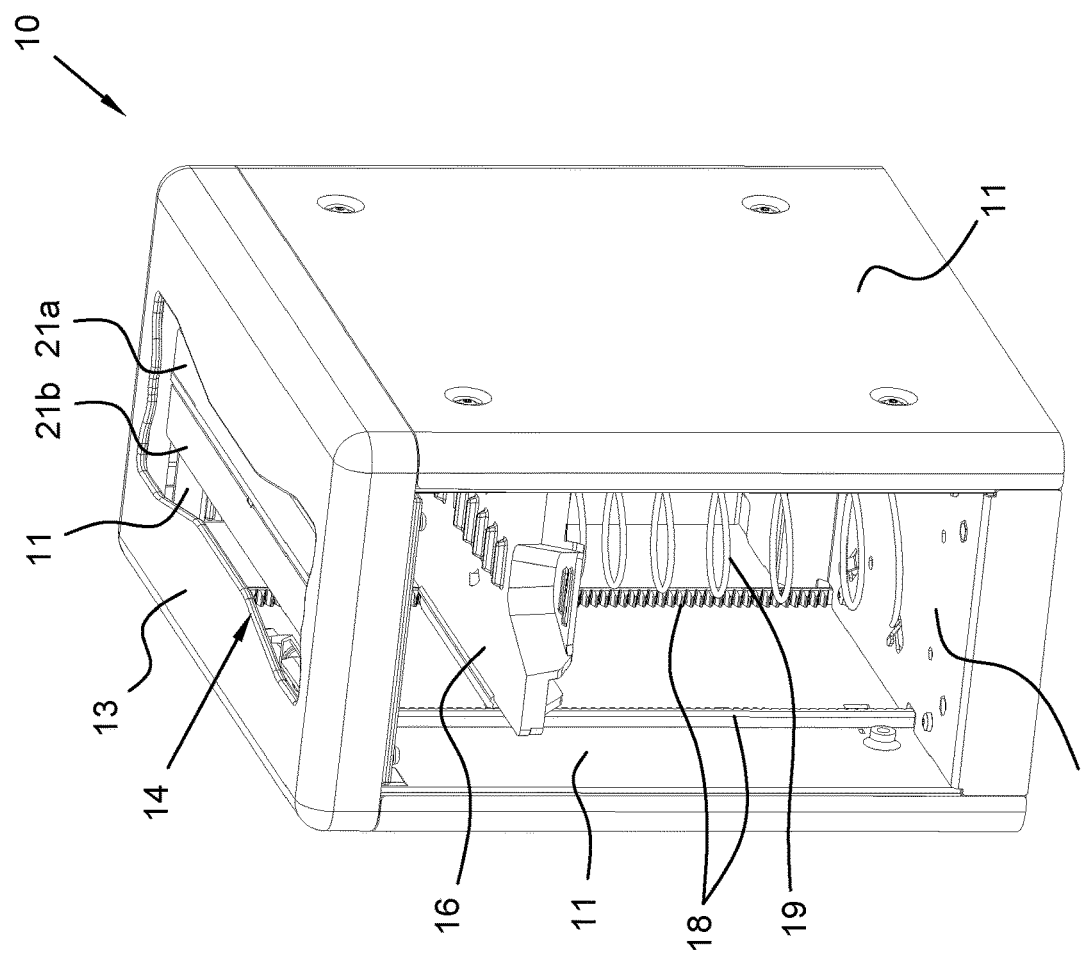
FIG. 3 shows a view similar to FIG. 2, with the sealing bars brought into the closed position, which they assume to seal the bag.
Figure 5:
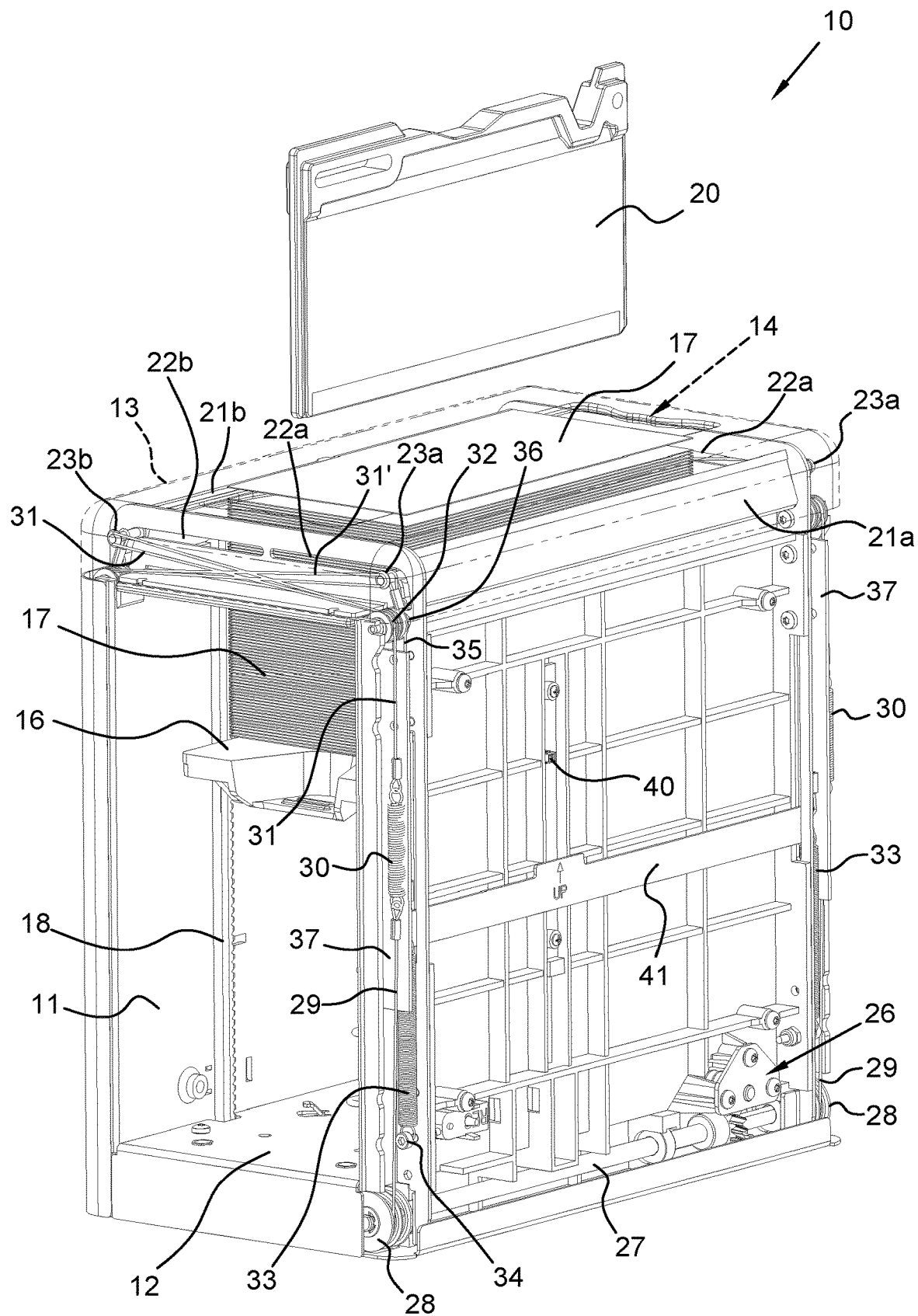
FIGS. 5, 7, 9, 11, 13 represent, in a perspective view, different steps of the bag filling and closing process.
Figure 6:
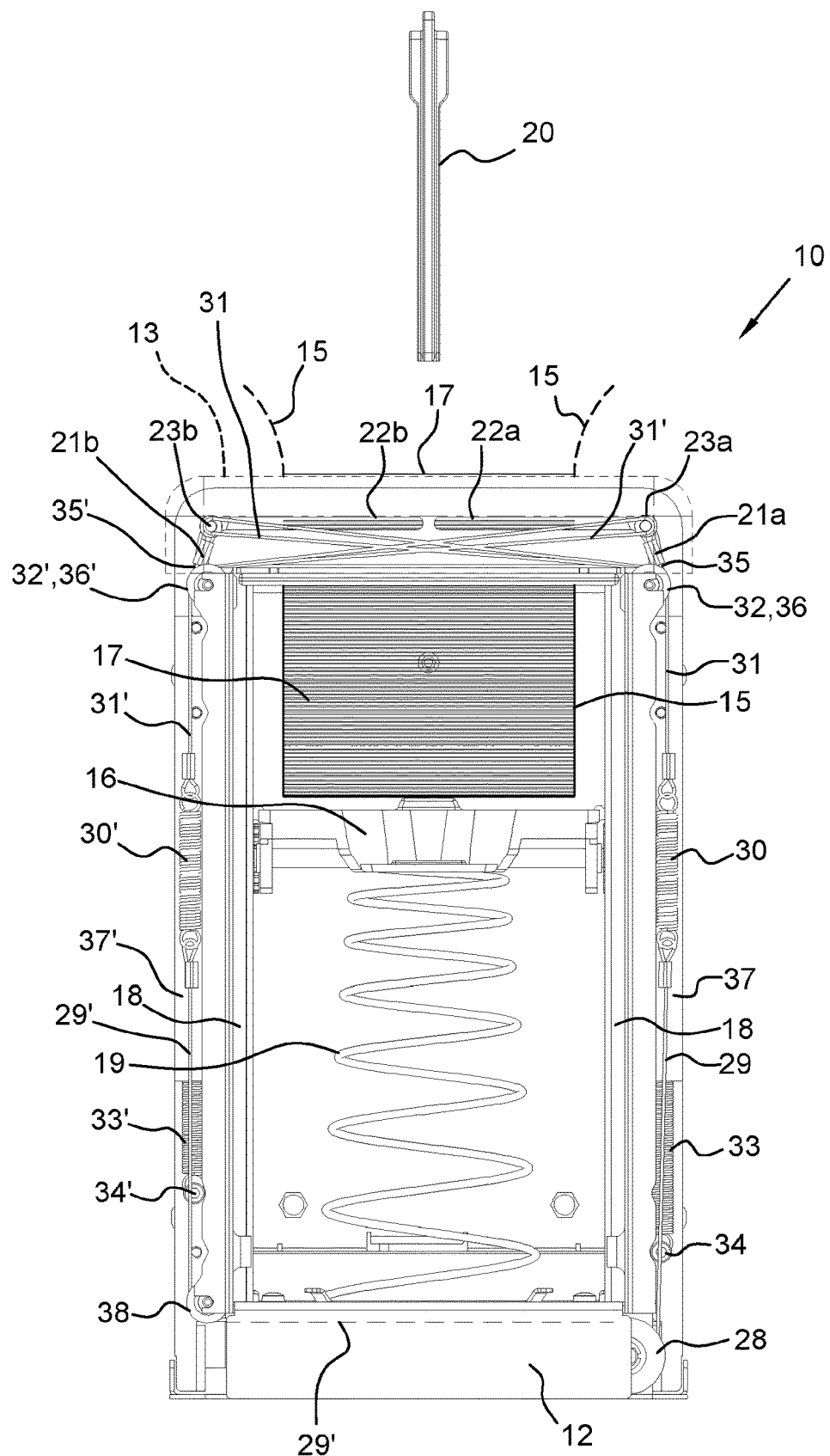
FIGS. 6, 8, 10, 12, 14 show the apparatus for filling and sealing bags according to front elevational views corresponding respectively to the steps illustrated in FIGS. 5, 7, 9, 11, 13.

In the attached drawings, some parts of the machine have sometimes been removed to allow the internal parts to be seen. In particular, one or more of the container side walls have generally been omitted and, in FIGS. 5-14, the upper lid has been shown as a broken line to make those parts that would otherwise be hidden by it, visible.

Furthermore, for the same reasons, as well as for greater graphic simplicity, the bag has been represented entirely only in the side views of FIG. 4 and FIGS. 10, 12 and 14, which show the apparatus when the sealing bars are closed, or immediately before.

The apparatus is intended to be included in well-known machines (not shown in the attached drawings) for storing banknotes, normally found in banks, supermarkets, shopping centres or the like. For the purpose of simplicity, reference is herein made to banknotes, but the apparatus according to the disclosure may likewise be used for managing and handling other paper documents in sheet form.

As it can be seen in FIGS. 1-4, the apparatus for filling and sealing bags intended for containing banknotes substantially comprises a generally parallelepiped-shaped container 10 having side walls 11, a bottom 12 and an upper lid 13 provided with an opening 14 suitable for allowing the passage of banknotes coming from a storage area inside the machine for managing and storing banknotes (not shown in the figures, as they are known machines in themselves), or directly from the inlet port of the machine, after the authenticity and integrity of the banknotes received has been duly verified.

The apparatus according to the disclosure is arranged to receive inside the container 10, through its upper opening 14, a bag 15 made of a flexible plastic film (shown, as said, only in the side elevation views for reasons of graphic clarity).

The bag 15 may be secured in a known manner to the machine, for example by fitting it around the upper lid and side walls of the container 10 itself, or by wrapping or hanging it from the possible upper container for temporary housing of the banknotes. Therefore, in the attached drawings the upper end of the bag 15 has been represented through an indefinite, broken line.

Inside the container 10, a plate 16 is arranged for supporting the banknotes 17 inserted in the bag 15, which is vertically movable along appropriate vertical guides 18 by means of controlled lowering and raising means, advantageously a compression spring 19 as shown in the illustrated embodiment.

The apparatus according to the disclosure further comprises a pressure element 20, vertically movable by means of suitable control means of the known type (not shown in the figures) between a raised position, external to the container 10 (illustrated for example in FIGS. 5-8) and a lowered position (illustrated in FIGS. 4 and 9-12) of at least partial insertion into the container 10 through the upper opening 14 to accompany the banknotes to be introduced into the container and to push down the stack of banknotes already present in the bag 15, resting on the plate 16, against the counteracting action of the spring 19.

The pressure element 20 is advantageously made with a small thickness in order to still be able to fit between the two sealing bars when they are in the "almost closed" position (visible in FIGS. 11-12), as will be described in more detail below.

Constructively, the pressure element 20 can therefore be seen as a substantially flat element, i.e., with a dimension in the direction moving towards/away from the sealing bars that is much smaller than the other two dimensions (length and height). For example, the thickness of the pressure element 20 can advantageously be between 5 mm and 20 mm.

As mentioned, the apparatus according to the disclosure further comprises a pair of sealing bars 21*a*, 21*b* arranged at the upper end of the container 10, just below the opening 14 of the lid 13.

The sealing bars 21*a*, 21*b* advantageously extend throughout the entire length of the opening 14 and of the banknote support plate 16, so that, when brought into contact with each other, sealing can be carried out over the entire width of the bag 15 in correspondence with an upper portion thereof, interposed between the bars themselves. For greater descriptive convenience, the two sealing bars will also be hereinafter referred to as "first bar" 21*a* with reference to the bar on the right-hand side of the machine, observing the attached figures, and as "second bar" 21*b* with reference to the opposite bar on the left-hand side of the machine.

The mobility of the sealing bars 21*a*, 21*b* moving towards/away from each other is allowed by means of respective horizontal grooved guides 22*a*, 22*b* present in the upper portion of the container 10 in correspondence with the ends of the bars themselves and oriented in the direction of movement of the latter; the bars are provided with first pins 23*a*, 23*b* protruding from each end to slide into the aforementioned grooved guides 22*a*, 22*b* as clearly shown in FIGS. 5-14. Advantageously, a further pin 24*a*, 24*b* is provided at each end of the sealing bars, slidingly inserted in the respective grooved guide 22*a*, 22*b*, so as to cooperate with the associated pin 23*a*, 23*b* to prevent undesired rotations of the bars and to maintain the intended mutual alignment thereof.

Figure 15:
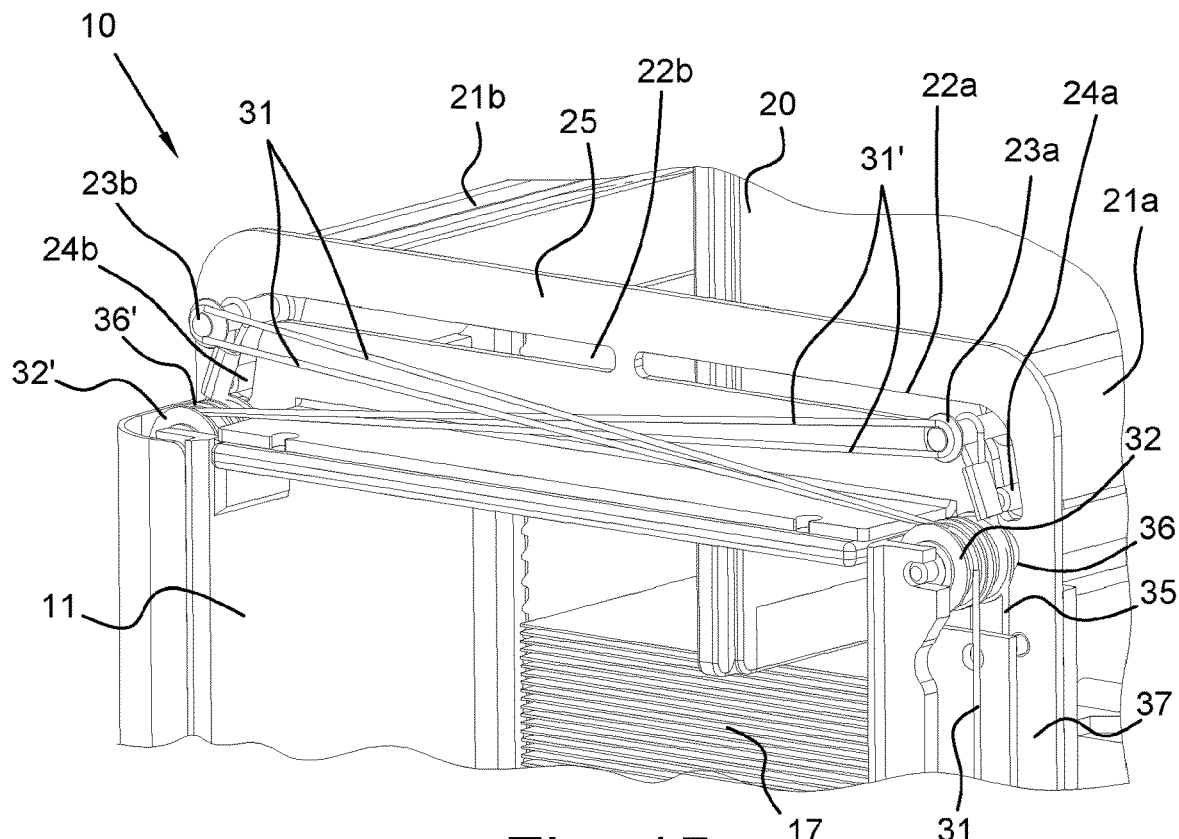
FIGS. 15-16 show an enlargement of the upper portion of the apparatus and of the kinematic movement mechanism of the sealing bars in the open bars and closed bars condition respectively.
Figure 16:
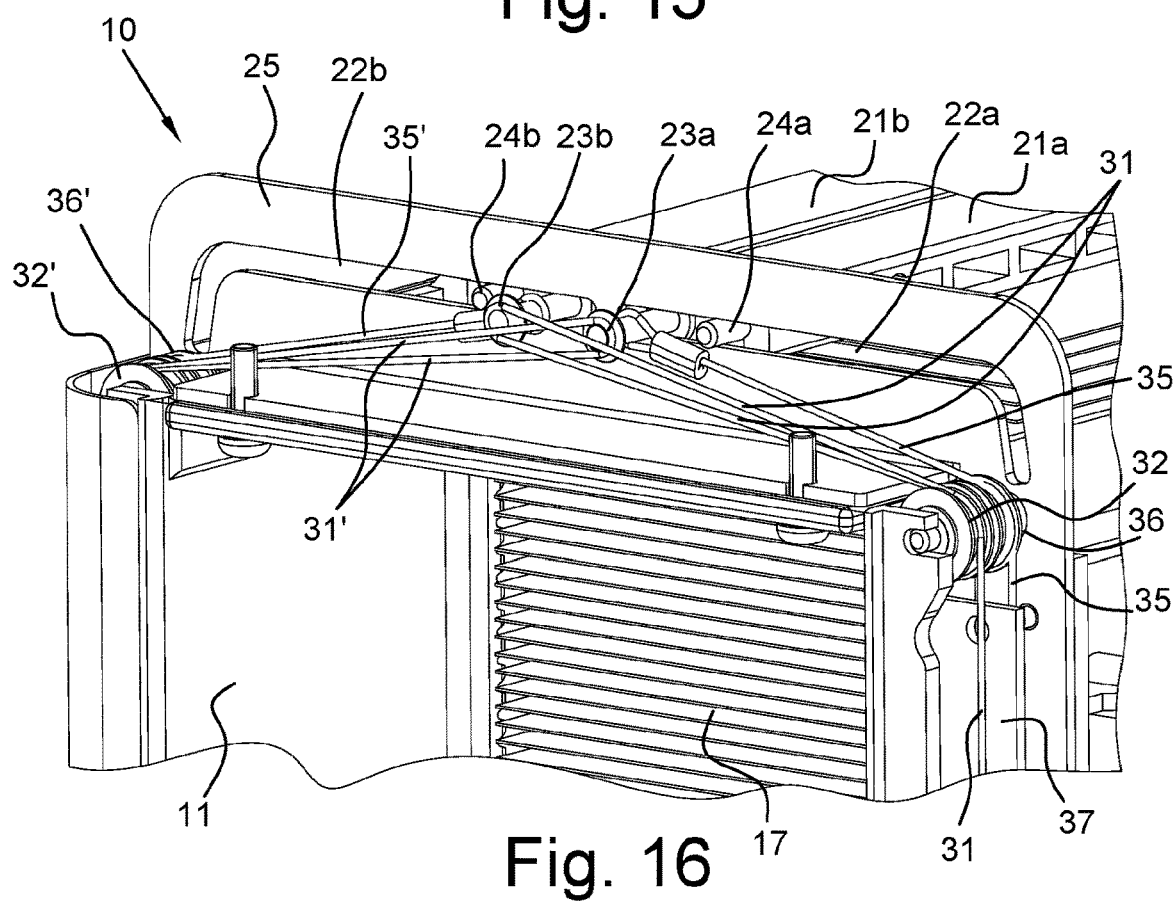

In the enlargements shown in FIGS. 15-16, the elements described above are shown in greater detail.

The grooved guides 22*a*, 22*b* are preferably made as open slots in the thickness of a sheet 25 arranged at each of the upper ends of the container 10 extending parallel to the direction of movement of the sealing bars, so as to allow at least the pins 23*a*, 23*b* to come out of the respective guide towards the ends of the container 10.

Advantageously, the ends of the slots 22*a*, 22*b* closest to the lateral sides of the container 10 are curved downwards, so as to allow the bars in a resting condition (fully open bars) to tilt vertically while remaining housed substantially along the side walls of the container itself without unnecessarily occupying space in the upper horizontal plane of the container and thus allowing the overall width of the machine to be reduced.

According to the disclosure, the apparatus for filling and sealing bags is provided with a system 21*a*, 21*b* for controlling and moving the sealing bars comprising a drive motor 26, advantageously arranged at the bottom on one side of the machine as visible in FIGS. 5, 7, 9, 11, 13, adapted to rotate a shaft 27 at whose ends, in correspondence with the two ends of the container, respective driving pulleys 28 are fastened, as clearly visible in the aforementioned figures.

The kinematic mechanism for moving the sealing bars 21*a*, 21*b* between the respective opening and closing positions will now be described in greater detail, with reference to the mechanisms present at the vertical edge of the container 10 visible in the foreground of FIGS. 5, 7, 9, 11, 13, it being understood that similar or equivalent mechanisms are preferably present at the other three vertical edges of the container 10 in order to distribute the stresses as evenly as possible and, therefore, to allow smooth and even movement of the sealing bars without the risk of jamming or misalignment. The mechanisms present in the other edges are however partially visible in the same FIGS. 5, 7, 9, 11, 13, as well as in FIGS. 6, 8, 10, 12, 14.

On the driving pulley 28 an actuating cable 29 is wound which extends upwards along the edge of the container 10 until it connects with the lower end of a tension spring 30, which is in turn connected at the upper end with a further cable 31 which reaches a first upper return pulley 32 to continue in an almost horizontal direction until it is anchored to the end pin 23b of the second sealing bar 21b (i.e. the sealing bar arranged at the opposite side of the machine with respect to the side where the motor 26, the driving shaft 27 and the driving pulleys 28 are located).

The kinematic connection formed by the spring 30 and the cable 31 is intended to control the closing of the sealing bars (and, in particular, of the second bar 21b), therefore the spring 30 and the cable 31 will be herein referred to as "closing spring" and "closing cable" respectively.

Always at the same edge of the container 10 a further tension spring 33 is arranged as anchored with its lower end to a fixed pin 34 on the frame of the container 10 and connected at its upper end to a cable 35 which reaches a second upper return pulley 36 to then anchor itself to the end pin 23a of the first sealing bar 21a (i.e. the sealing bar arranged at the side of the machine where the motor 26, the driving shaft 27 and the driving pulleys 28 are located).

The kinematic connection formed by the spring 33 and the cable 35 is intended to control the opening of the sealing bars (and, in particular, of the first bar 21a), therefore the spring 33 and the cable 35 will be herein referred to as "opening spring" and "opening cable" respectively.

In order to allow the sealing bars to work properly while opening and closing, the closing spring 30 will have an elastic constant greater than the opening spring 33. In other words, in the described kinematic mechanism, the closing spring 30 must exert a greater force than the opening spring 33.

Advantageously, the springs 30, 33 (with the respective cables 31 and 35) are separated from each other by a partition 37 extended vertically along the edge of the container 10, so as to avoid mutual interference between the parts.

As seen, the opening spring 33 and the opening cable 35 act directly on the first sealing bar 21a (i.e., the bar arranged on the same side of the container 10 where said actuating elements are placed), whereas the closing spring 30 and the closing cable 31 act on the second sealing bar 21b (i.e., the bar arranged on the opposite side of the container 10).

In order to achieve a good movement synchronisation of the two sealing bars, similar opening springs 33' and opening cables 35' are advantageously provided at the opposite edges of the container 10 (i.e. at the side of the second sealing bar 21b), anchored to the respective end pins 23b of the second sealing bar 21b, while further closing springs 30' and closing cables 31' are provided at the same opposite edges of the container 10, anchored to the respective end pins 23a of the first sealing bar 21a.

In order to allow the closing springs 30' to move along said opposite edges of the container 10 like what is made by the previously described actuating cable 29, the driving pulleys 28 are connected to the lower end of the aforesaid closing springs 30' by means of a respective auxiliary actuating cable 29' extending horizontally from the corresponding driving pulley 28, under the bottom 12 of the container 10, up to a third lower return pulley 38 placed at the base of said opposite edges, from where it bends upwards until it reaches the closing spring 30'. Corresponding upper return pulleys 32', 36', pin 34' for anchoring the opening spring 33' and partition 37' between the opening and closing springs are of course present at the aforementioned opposite edges of the container 10.

The kinematic elements described above are clearly visible in FIGS. 6, 8, 10, 12, 14.

This makes it possible to achieve complete actuation symmetry of the sealing bars.

The apparatus for filling and sealing bags according to the disclosure is further provided with sensors to detect some positions that the sealing bars may assume during the machine operation and, in particular, an "open bars" sensor 39 (visible in FIGS. 11 and 13) and an "almost closed bars" sensor 40 (visible in FIGS. 5, 7, 9 and 11), suitable for cooperating with a slider 41 movable integrally with the sealing bars.

Figure 11:
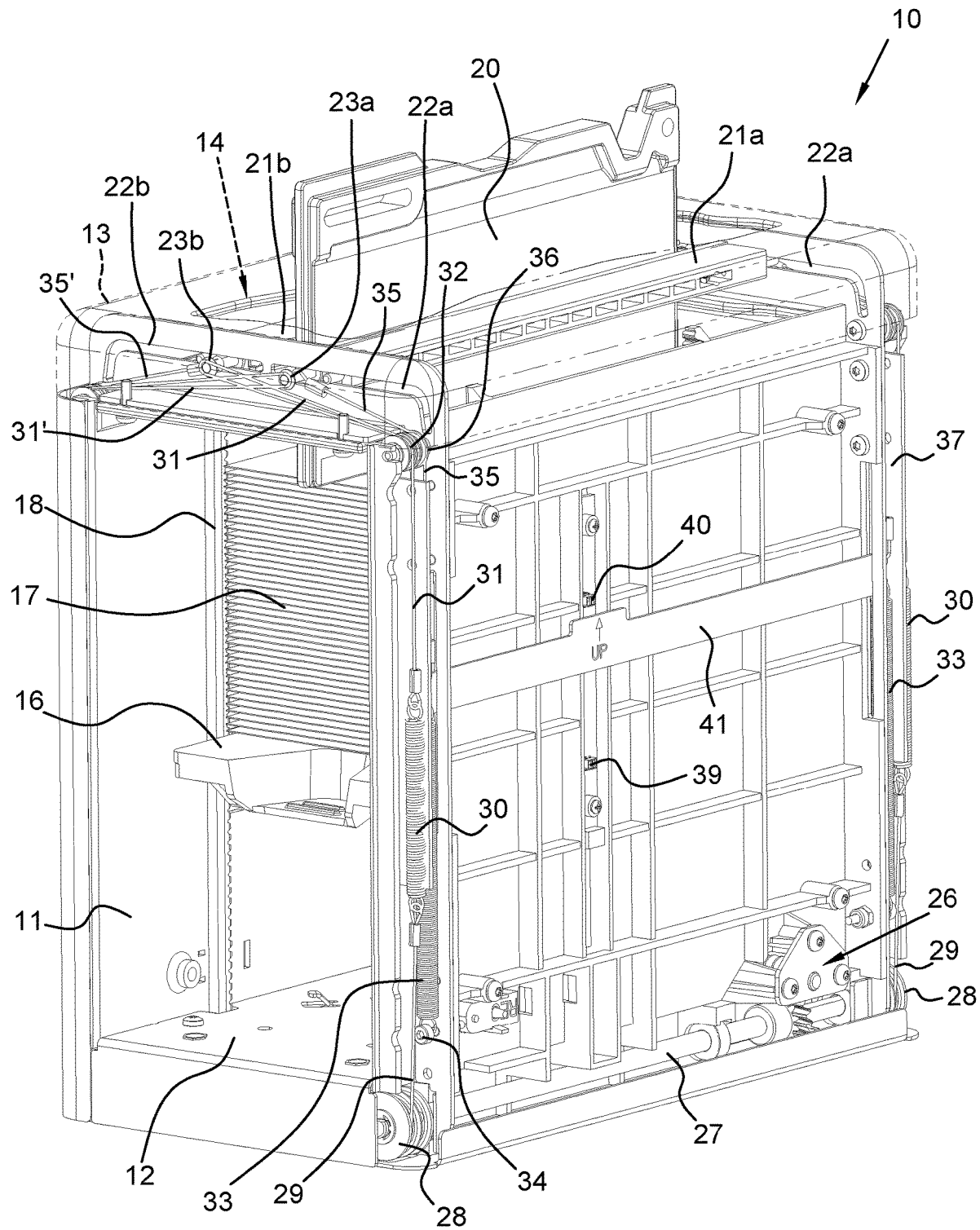

According to the preferred embodiment shown in the accompanying drawings, the position sensors 39, 40 are arranged, vertically spaced, on one of the sides of the container 10 (for example, the one where the motor 26, the driving shaft 27 and the driving pulleys 28 are present) and the slider 41 consists of a horizontal sheet constrained to the opening cable 35 to move vertically according to the movement of the bar 21a, between a position in which said sheet covers the lower sensor 39, so that the latter can send to a control unit an "open bars" signal (corresponding to the situation shown in FIGS. 5, 7, 9), and a position in which said sheet covers the upper sensor 40, so that the latter can send to the control unit an "almost closed bars" signal (corresponding to the situation illustrated in FIG. 11).

A part of the machine operating cycle will now be briefly described to illustrate the operation of the apparatus for filling and sealing bags according to the disclosure. In the situation illustrated in FIGS. 5 and 6, a number of banknotes 17 have already been introduced into the container 10 through the upper opening 14 and are stacked on the plate 16 in a plastic bag (as mentioned above, for ease of graphical clarity the bag 15 has generally been omitted in the perspective views and is only shown in its entirety in FIGS. 10, 12 and 14 concerning the final stages of closing the bag). The sealing bars 21a, 21b are open (and, therefore, the "open bar" sensor 39 remains covered by the slider 41 which is in its lowest position) and the plate 16 is pushed by the spring 19 upwards while keeping the banknotes 17 pressed against the lower surface of the lid 13. It should be noted that, as it can be seen clearly in FIGS. 1-3, the opening 14 in the lid 13 is shaped to be narrower than the narrowest banknote that is expected to be stored in the machine and therefore, once inserted into the bag supported by the plate 16, the banknotes cannot spill out from the container 10 despite the pressure exerted by the spring 19. One or more new banknotes 17 are arranged above the lid 13, ready to be subsequently introduced into the bag by means of the pressure element 20.

Figure 7:
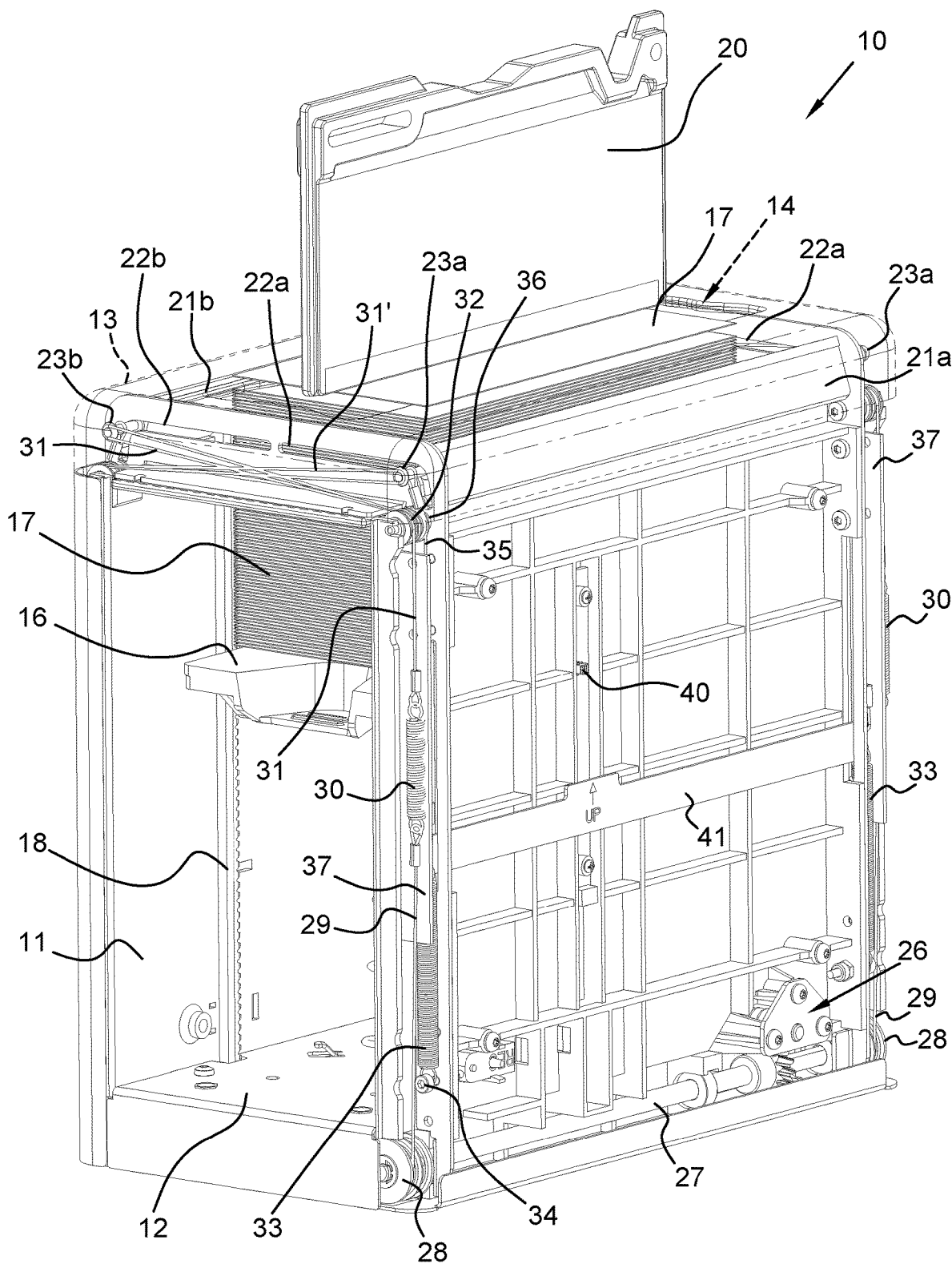
Figure 8:
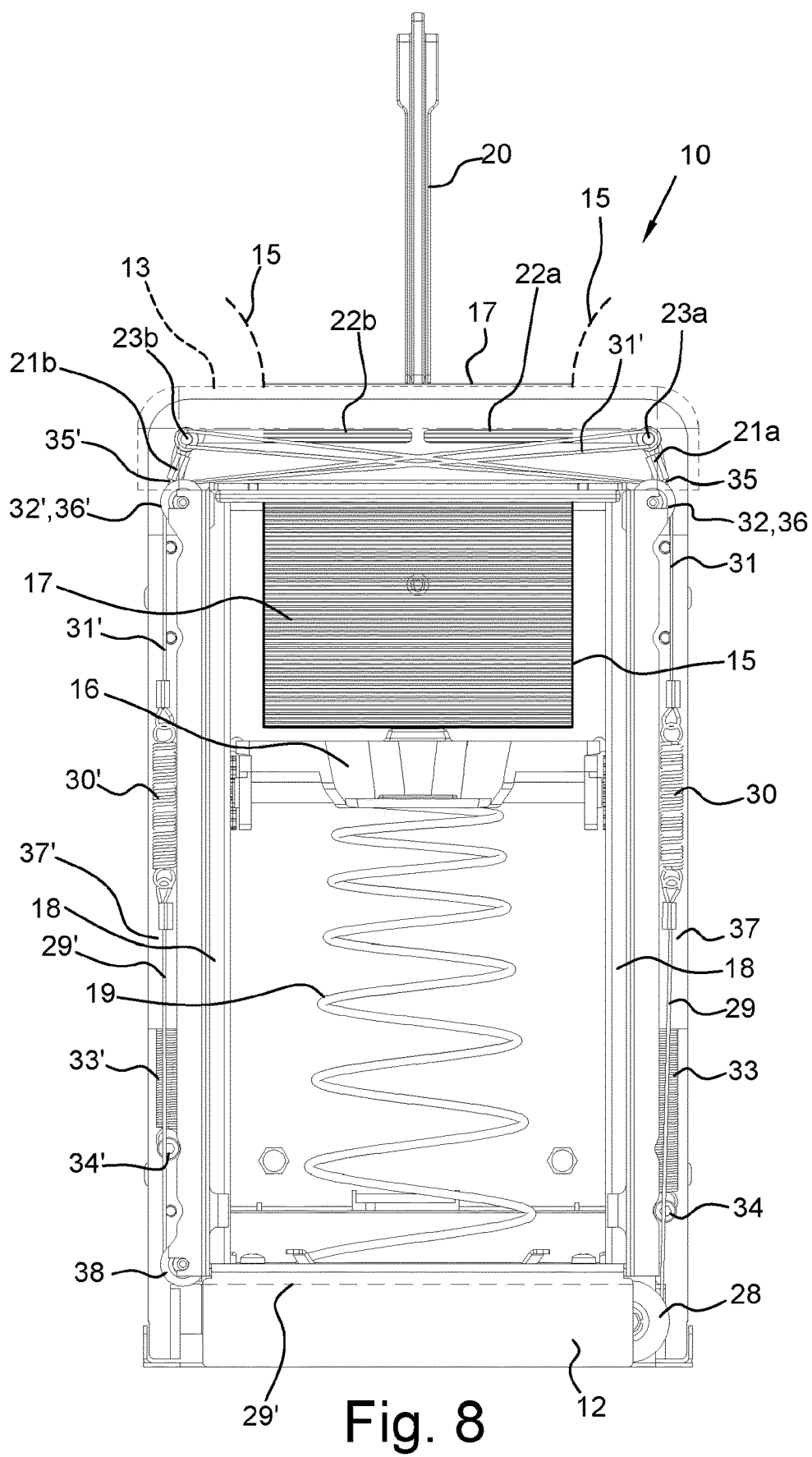

In the situation illustrated in FIGS. 7 and 8, the pressure element 20 is lowered until it comes into contact with the further banknotes 17 present above the lid 13 and, with its further lowering, begins to deform them while pushing them inside the bag into the container 10 through the opening 14. The sealing bars 21a, 21b are still open, in the same position as in FIGS. 5 and 6. This operation of introducing new banknotes through the opening 14 can be repeated until the bag is deemed to have reached the desired maximum filling level.

Figure 9:
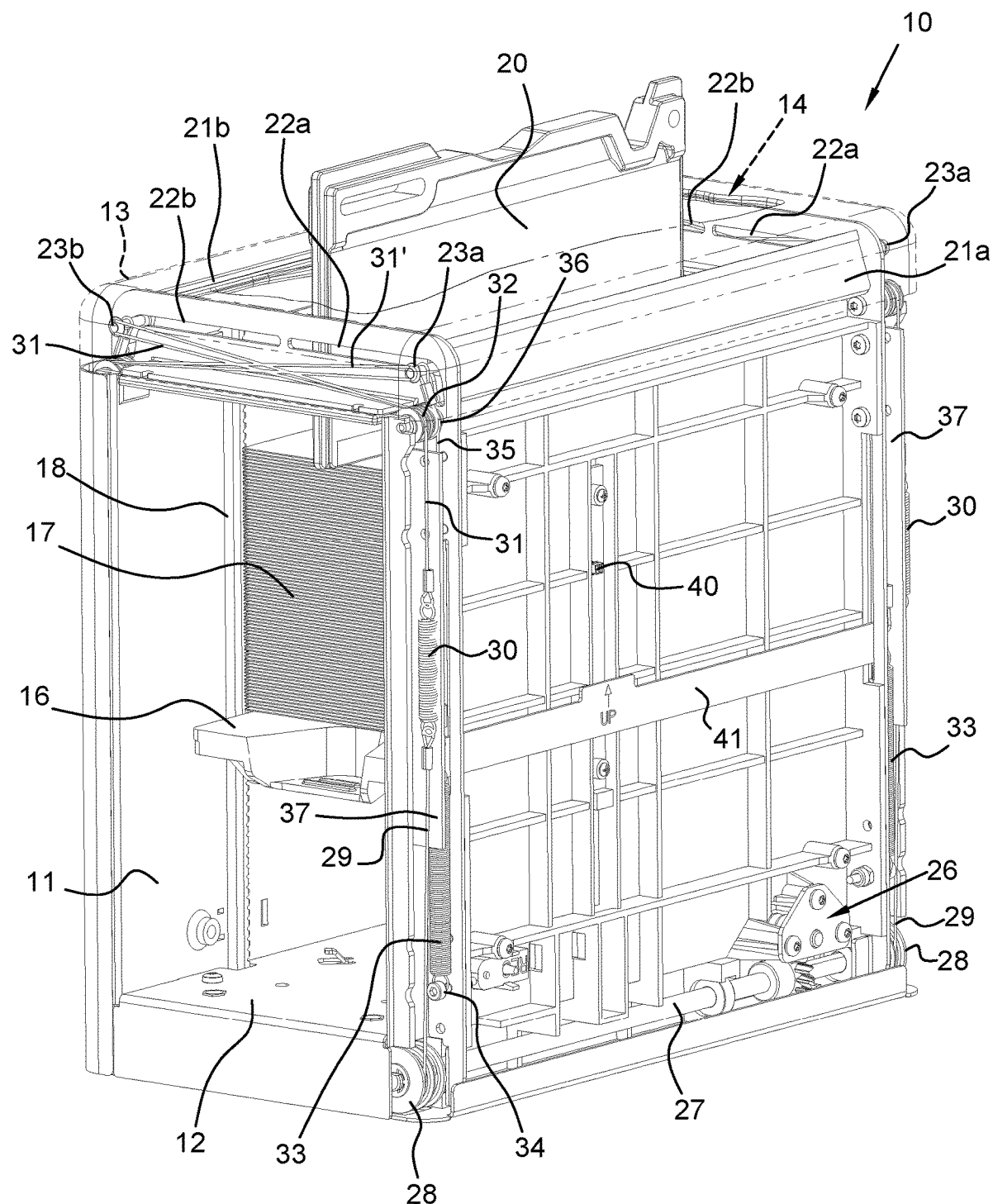
Figure 10:
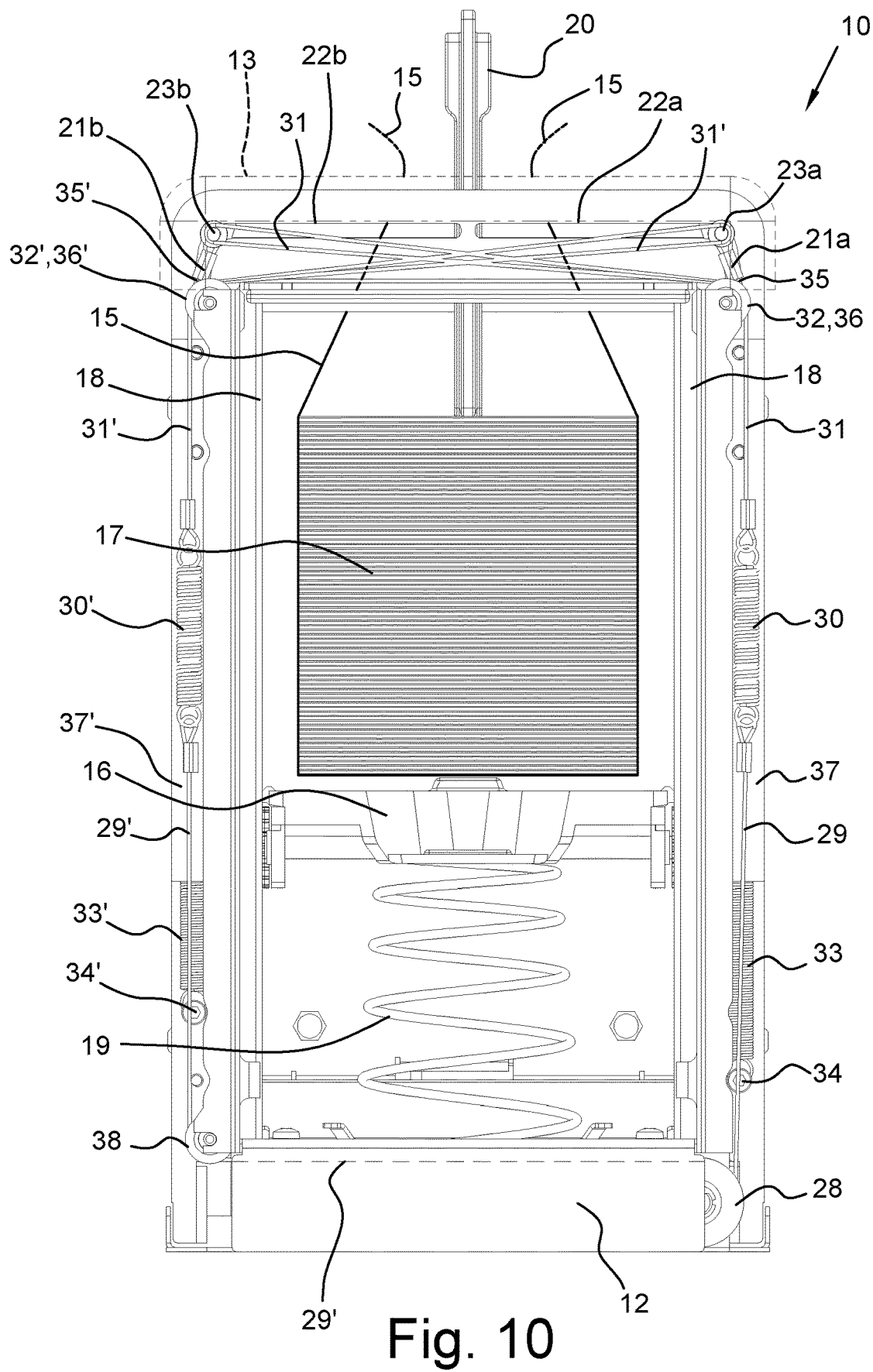

In the situation illustrated in FIGS. 9 and 10, the last banknotes have been introduced into the bag 15 and a further lowering of the pressure element 20 causes a greater lowering of the plate 16 with the bag resting on it. The banknotes 17 are thereby kept at a distance from the lower surface of the lid 13 (and, in particular, sufficiently far from the operating area of the sealing bars 21a, 21b) by the pressure element 20 partially inserted, through the opening 14, into the container 10.

At this point, the motor 26 can control the rotation of the shaft 27 and the driving pulleys 28, so that the actuating cable 29 and the auxiliary cable 29' pull down the closing springs 30, 30' which, thanks to their greater elastic constant than the opening springs 33, 33', through the corresponding closing cables 31, 31' can respectively translate the sealing bar 21b and the sealing bar 21a towards the closed position. At the same time, the movement of the two bars 21a, 21b causes, through the opening cables 35, 35', an upward extension of the respective opening springs 33, 33'.

Figure 12:
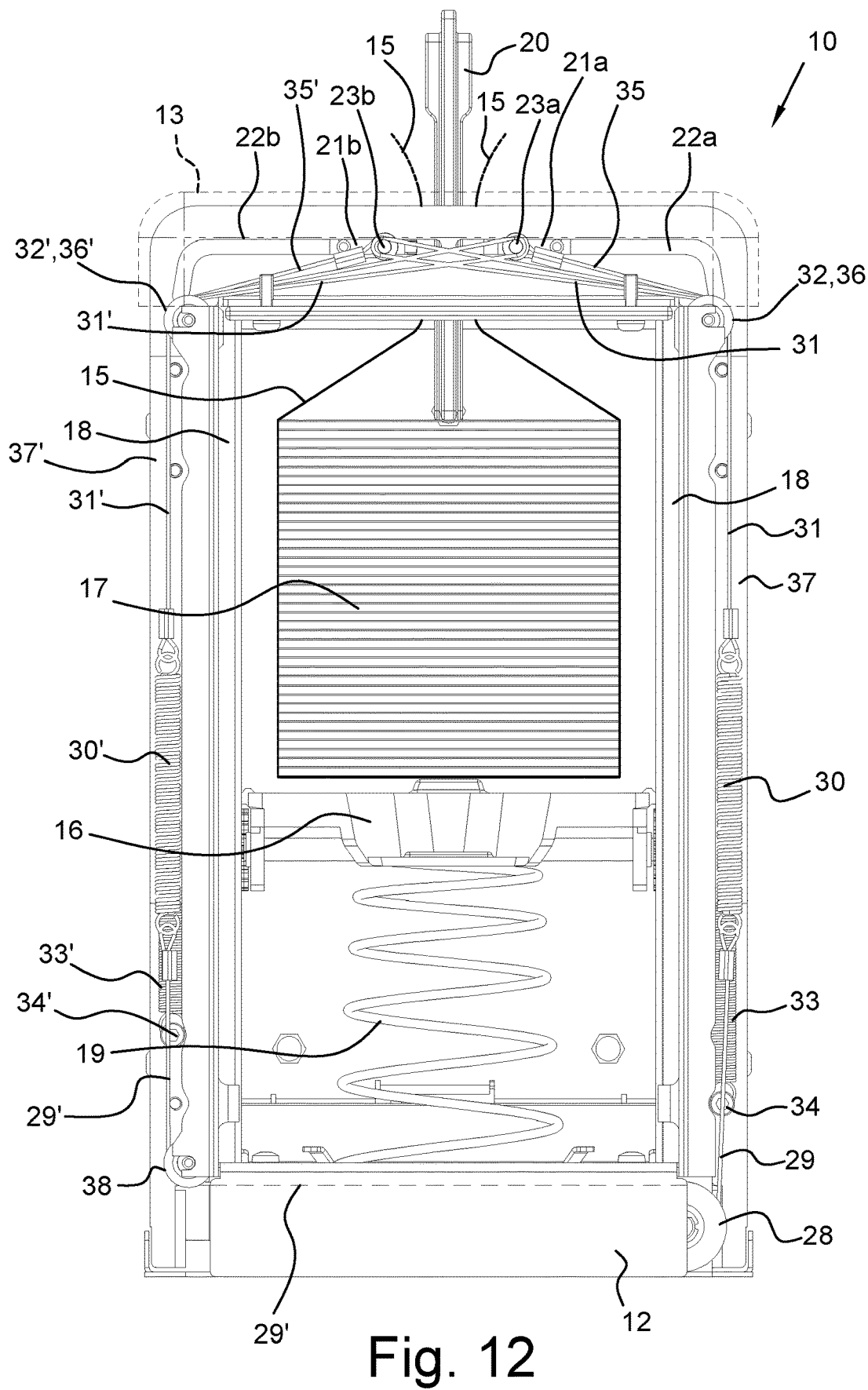

FIGS. 11 and 12 illustrate the situation just before the sealing bars reach the "almost closed" position, which occurs when the slider 41 covers the "almost closed bars" sensor 40 and the bars are almost in contact with the sides of the pressure element 20. With the bars in the "almost closed" position, the pressure element 20 can be pulled out of the container by moving upwards, but the small gap between the two bars 21a, 21b (substantially corresponding to the extremely thin thickness of the pressure element 20) does not allow the banknotes to be accidentally spilled out of the bag and to position themselves wrongly between the sealing bars.

Figure 13:
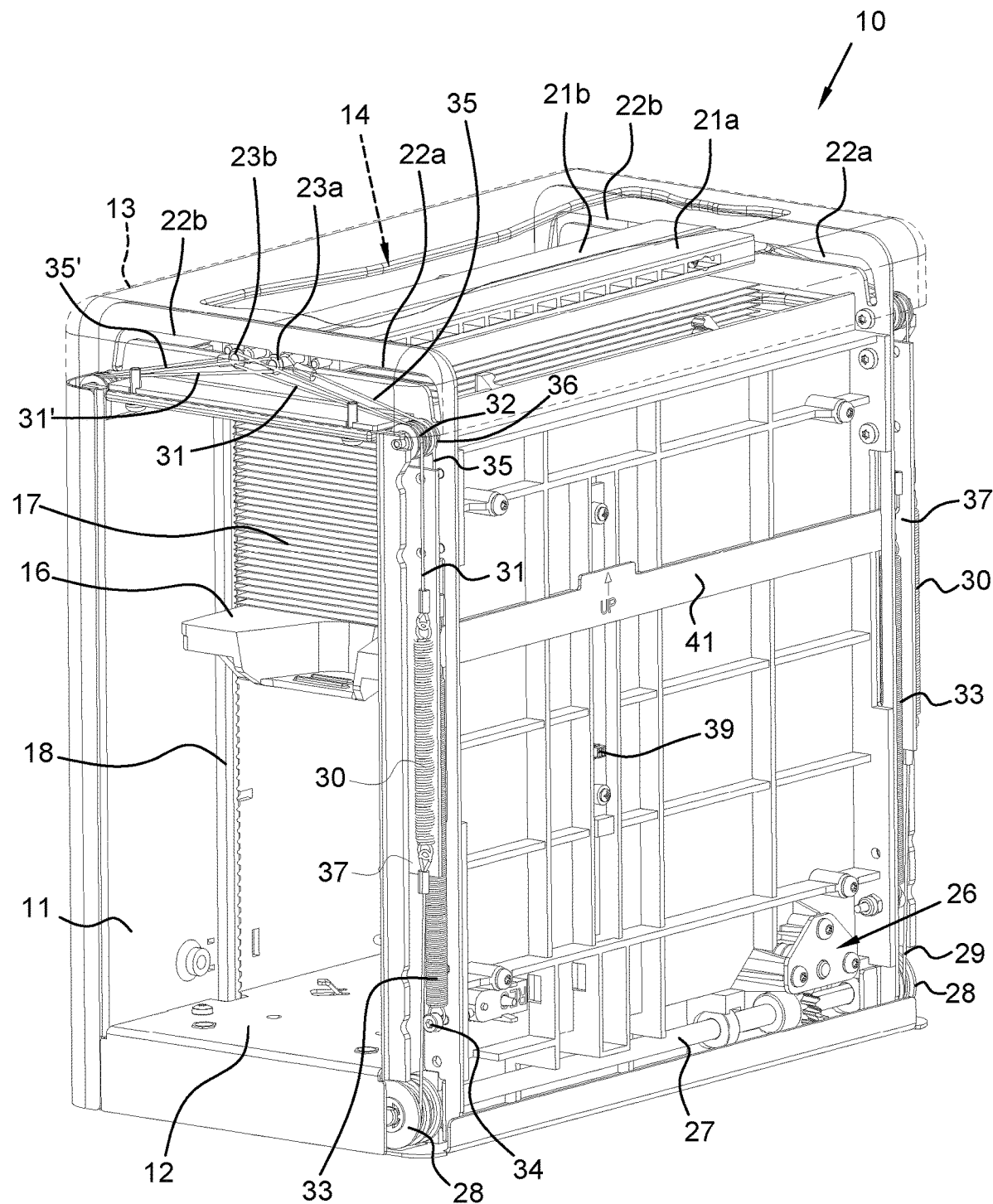
Figure 14:
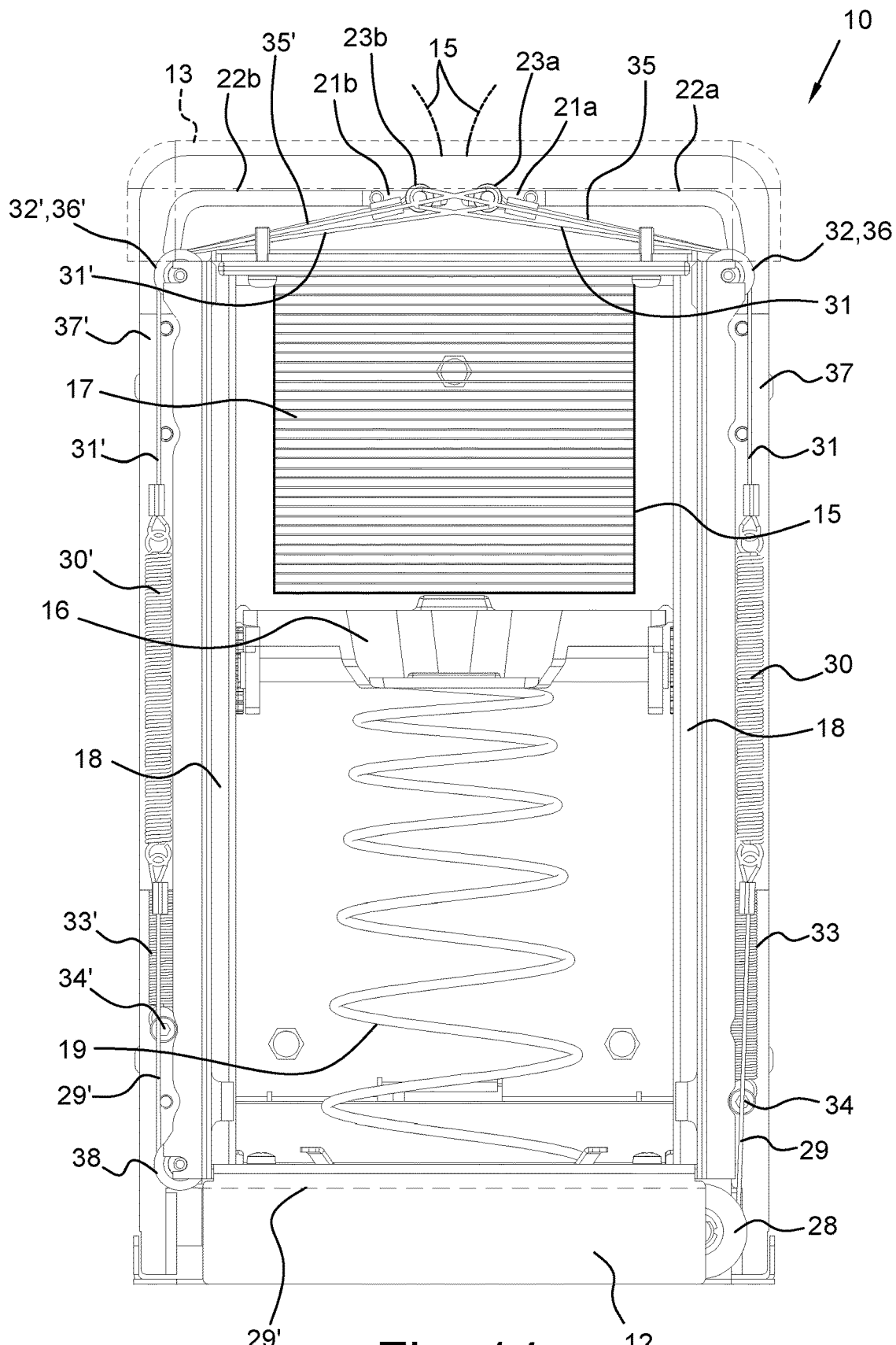

FIGS. 13 and 14 illustrate the final step, when the pressure element has been completely pulled out of the container and the banknotes inside the bag 15 are pressed against the sealing bars by the spring plate 16. At this point, the sealing bars 21a, 21b can be closed completely and heated, thus sealing the bag 15. At the end of the process, the bars are reopened and the closed bag is ready to be extracted from the container 10.

It is now clear that the apparatus for filling and sealing bags for containing banknotes according to the disclosure achieves the intended purposes by minimising the space required for the sealing bars and their control kinematic mechanisms. In addition, such a thin pressure element makes it possible to be pulled out of the container with the sealing bars in an almost completely closed position, thus preventing any banknotes from being spilled out while the pressure element moves away, accidentally interposing between the bars during the step of sealing the bag.

Clearly, the above description of an embodiment applying the innovative principles of the present disclosure is given by way of an illustrative example of such innovative principles and must not, therefore, be taken to limit the scope of the patent claimed herein.

For example, the kinematic chains consisting of springs and cables described herein could be made in different configurations, although kinematically equivalent to those illustrated.

In particular, since, as seen, the springs 30, 30' of the kinematic connection for closing the sealing bars must be provided with a greater elastic force than the springs 33, 33' of the opening kinematic connection in order to ensure the correct operation of the system and a sufficient closing force of the bars, the aforementioned springs 30, 30' of the kinematic connection for closing the bars could also be conceived with an infinite elastic constant and therefore, for example, be replaced by cables or equivalent elements. The entire kinematic connection of the sealing bars could therefore comprise a single actuating cable, still within the scope of the claimed disclosure.

The invention claimed is:

1. An apparatus for filling and sealing bags for containing banknotes, comprising a generally parallelepiped-shaped container, with side walls, a bottom and an upper lid provided with an opening suitable for allowing entry into the container of a bag, made up of flexible plastic film, and of banknotes intended to be introduced into the same bag, the apparatus further comprising a plate arranged inside the container for supporting the banknotes inserted into the bag and movable vertically by controlled lowering and raising means, a first and a second sealing bar arranged at the upper end of the container, under the opening of the lid, and moving towards/away from each other between an opening position, in which the bars are far away from each other to allow the introduction of the banknotes into the container through the opening, and a closing position, in which the bars are brought into mutual contact to carry out the sealing of an upper portion of the bag interposed therebetween, and a pressure element vertically movable on command between a raised position, external to the container, and a lowered position for at least the partial insertion into the container through the upper opening to accompany new banknotes to be introduced into the container and to push down banknotes already present in the bag, resting on the plate, the apparatus also including a system for control and movement of the sealing bars between the respective opening and closing positions, wherein the control and movement system of the sealing bars comprises a motor for driving a shaft adapted to rotate at least one driving pulley arranged below in correspondence with a vertical edge of the parallelepiped-shaped container, a kinematic connection for closing the bars comprised of a combination of cables and tension springs connecting the driving pulley to the sealing bars and a kinematic connection for opening the bars comprised of a combination of cables and tension springs connecting the sealing bars to a respective fixed anchor point on the container.

2. The apparatus according to claim 1, wherein in the upper portion of the container there are provided, at its two ends, grooved guides oriented in the movement direction of the bars, and the first and second sealing bars are provided with respective first pins protruding from each end thereof to slide into a corresponding grooved guide, in that the kinematic connection for closing the bars comprises a first sequence of cables and tension springs connecting the driving pulley to one of the protruding pins of the second sealing bar, arranged on the opposite side of the container with respect to the vertical edge where the driving pulley is located, and a second sequence of cables and tension springs connecting the driving pulley to one of the protruding pins of the first sealing bar, arranged on the side of the container where there is the vertical edge where the driving pulley is located, and in that the kinematic connection for opening the bars comprises a first sequence of cables and tension springs connecting said protruding pin of the first sealing bar to the respective fixed anchor point and a second sequence of cables and tension springs connecting said protruding pin of the second sealing bar to the respective fixed anchor point.

3. The apparatus according to claim 2, wherein said first sequence of cables and tension springs of the kinematic connection for closing the bars comprises a first actuating cable extending from the driving pulley upwards, along the aforementioned vertical edge of the container where the driving pulley is located, until it connects with the lower end of a tension spring, which in turn is connected at the upper end with a further cable reaching a first upper return pulley to continue in an almost horizontal direction until it is anchored to said protruding pin of the second sealing bar, and in that said second sequence of cables and tension springs of the kinematic connection for closing the bars comprises an auxiliary actuating cable extending from the driving pulley, under the bottom of the container, up to a lower return pulley placed at the base of a vertical edge of the container opposite to the side where the driving pulley is located, from where it bends upwards until it connects with the lower end of a tension spring, which in turn is connected at the upper end with a further cable reaching an own respective upper return pulley to continue in an almost horizontal direction until it is anchored to said protruding pin of the first sealing bar.

4. The apparatus according to claim 2, wherein said first sequence of cables and tension springs of the kinematic connection for opening the bars comprises, in correspondence with the aforementioned vertical edge of the container where the driving pulley is located, a tension spring anchored with its lower end to said fixed anchor point and connected at the upper end to a cable reaching a second upper return pulley to then anchor itself to said protruding pin of the first sealing bar, and in that said second sequence of cables and tension springs of the kinematic connection for opening the bars comprises, at said opposite edge of the container, a tension spring anchored with its lower end to the respective fixed anchor point and connected at the upper end to a cable reaching an own respective upper return pulley to then anchor itself to said protruding pin of the second sealing bar.

5. The apparatus according to claim 2, wherein each sequence of cables and tension springs of the kinematic connection for closing the bars is separated by a partition from the sequence of cables and tension springs of the kinematic connection for opening the bars which is located at the same vertical edge of the container.

6. The apparatus according to claim 2, wherein a further pin is present at each end of the sealing bars, slidably inserted in the respective grooved guide.

7. The apparatus according to claim 6, wherein the grooved guides are formed as open slots in the thickness of a sheet arranged at each of the upper ends of the container extending parallel to the direction of movement of the sealing bars, at least said first pins coming out of the respective guide towards the ends of the container.

8. The apparatus according to claim 2, wherein the ends of the grooved guides closest to the lateral sides of the container are curved downwards, configured to allow an inclined arrangement of the sealing bars when in the fully open position.

9. The apparatus according to claim 1, wherein the shaft driven by the motor is provided at both ends with driving pulleys and a respective kinematic connection for closing the sealing bars and a respective kinematic connection for opening the sealing bars are associated with each pulley.

10. The apparatus according to claim 1, wherein the pressure element has a thickness, in the approaching/removal direction of the sealing bars, which is much smaller than its other dimensions, preferably between 5 mm and 20 mm, said thickness being able to identify a position of "almost closed bars" for the sealing bars when the pressure element is partially inserted into the container through the opening.

11. The apparatus according to claim 1, wherein the means for controlled lowering and raising of the plate are constituted by a compression spring.

12. The apparatus according to claim 1, wherein it comprises sensors for detecting the position of the sealing bars.

13. The apparatus according to claim 12, wherein said position sensors are arranged spaced vertically, on one of the sides of the container and are able to cooperate with a slider movable integrally with the sealing bars.

14. The apparatus according to claim 1, wherein the springs of the kinematic connection for closing the sealing bars have a greater elastic force than the springs of the kinematic connection for opening the bars.

* * * * *